United States Patent
Fehn et al.

(10) Patent No.: US 8,287,164 B2
(45) Date of Patent: Oct. 16, 2012

(54) OUTSIDE MIRROR LIGHTING ASSEMBLY AND METHOD OF FORMING SAME

(75) Inventors: Edmund Fehn, Bad Überkingen (DE); David J. Cammenga, Zeeland, MI (US); Richard T. Fish, Jr., Jenison, MI (US); Darin D. Tuttle, Byron Center, MI (US); Mark A. Snyder, Zeeland, MI (US)

(73) Assignee: Gentex Corporation, Zeeland, MI (US)

( * ) Notice: Subject to any disclaimer, the term of this patent is extended or adjusted under 35 U.S.C. 154(b) by 467 days.

(21) Appl. No.: 12/210,452

(22) Filed: Sep. 15, 2008

(65) Prior Publication Data

US 2010/0067253 A1 Mar. 18, 2010

(51) Int. Cl.
*B60Q 1/26* (2006.01)
*B60R 1/12* (2006.01)

(52) U.S. Cl. ........................ 362/494; 362/555

(58) Field of Classification Search ............. 362/249.02, 362/311.02, 494, 545, 555, 800
See application file for complete search history.

(56) References Cited

U.S. PATENT DOCUMENTS

2004/0070857 A1* 4/2004 Bonardi et al. ............... 359/871

FOREIGN PATENT DOCUMENTS

JP 6-81836 3/1997

* cited by examiner

*Primary Examiner* — Jason Moon Han
(74) *Attorney, Agent, or Firm* — Price Heneveld LLP; Scott P. Ryan (57) ABSTRACT

An outside mirror lighting assembly (100) and method includes a housing (108) and a first glass panel (101) where one or more light emitting devices (107) are positioned at an edge of the first glass panel (101). Light rays from the at least one light emitting device (107) propagate within the glass panel for illumining its outer periphery. Words, logos, or other indicia (125) may be also be illuminated by direct or indirect light emitted into an etched area of the glass. The mirror assembly supplies a soft illuminated glow around the outer periphery and/or the indicia for proving a unique and pleasing appearance to the user.

31 Claims, 7 Drawing Sheets

OUTSIDE MIRROR LIGHTING ASSEMBLY AND METHOD OF FORMING SAME

FIELD OF THE INVENTION

This invention relates to mirror lighting and more particularly to lighting which extends around the perimeter of a vehicle's outside mirror.

BACKGROUND

Mechanical lighting systems have been used in vehicular applications for other than road lighting for many years. In one application, lighting is often used on the back side of the rear view mirror which projects directly through the mirror for use in various applications. Some of these uses include turn signals integrated into the mirror as well as down or "puddle" lighting used for illuminating the ground under the mirror. Still other applications include lighting used to illuminate a key lock or other surfaces on the exterior of the vehicle. In each of these uses, the light is positioned in some type of housing such that it shines outwardly from directly behind the glass for viewing by the driver and others.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an automotive lighting system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the present invention are directed to the illumination of the outer periphery edge of a glass sheet. These embodiments operate by directing dispersed light into a specific area of the glass, while extracting the light around the glass periphery. Light may be extracted from the glass through a variety of methods for producing a soft illuminated glow around the outer periphery of the mirror. In further embodiments, a specific design, logo, and/or other indicia may be placed in the glass by texturing, etching or grinding an area of interest such that design or logo can be illuminated. As described herein, the indicia is illuminated using the outer glass periphery of an interior rearview or exterior side mirror by direct or indirect light emitted into an edge of the glass.

Hence, a primary function provided by one embodiment of the present invention is to provide a distinguishing illuminated appearance when a vehicle's remote keyless entry system is engaged by illuminating a glowing ring of light around the periphery of the outside vehicle mirror. A subsequent function provides a distinguishing appearance can also be used while driving the vehicle at night as part of the ambient lighting for the vehicle. The light level may be controlled by an interior dashboard or operating panel dimming device or independently controlled through the use of an independent electric device such an optical encoder or potentiometer. In addition, the light level may be controlled by an interior electrochromic mirror's ambient light sensor signal for dynamically adjusting the light level to match the ambient light conditions. Additionally, an independent light sensor located on the lighting module or another control module on the outside vehicle mirror could be used to control the light level of the embodiment. Still yet other functions include operation of the illuminated non-continuous ring as a supplemental turn signal, side blind zone detection indicator, and/or an auxiliary approach light. Vehicle branding or other indicia can also be implemented using an intentional deformation in the glass surface for allowing a glowing emblem, logo, and/or design to appear on the glass surface.

Figure 1:
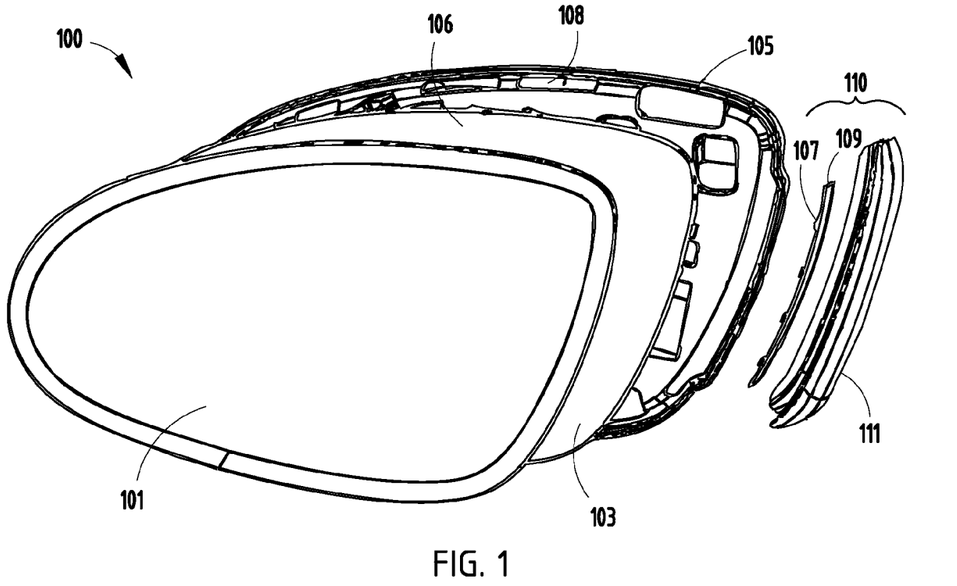
FIG. 1 is an exploded view of the outside mirror lighting assembly according to a first embodiment of the present invention.

FIG. 1 is an exploded view of the outside mirror lighting assembly 100 according to a first embodiment of the present invention. A first glass panel or sheet 101 and second glass panel or sheet 103 are positioned such that the first glass sheet sits on top a front surface 106 of the second glass sheet 103. The first glass sheet 101 is the most outwardly to the user where both the first glass sheet 101 and second glass sheet 103 are glass having a predetermined thickness where the second glass sheet 103 may include a reflective surface (not shown) on its front or back side. The first glass sheet 101 and the second glass sheet 103 can be a planar, convex, or convex/aspheric form. Those skilled in the art may also recognize that an electrochomatic (EC) layer may be placed between the first glass sheet 101 and the second glass sheet 103 in order to alter reflective properties of the mirror element. Both the first glass sheet 101 and second glass sheet 103 are positioned within a housing 105. Although illustrated as an outside mirror, the housing 105 may be modified as an interior vehicular mirror housing. The carrier or housing 105 will also incorporate various fastening methods in order to secure it to the vehicle and one or more relief areas 108 for allowing flexibility of the outer lip of the housing 105. At an edge of the first glass sheet 101, a lighting unit 110 is used to propagate light through the first glass sheet 101 in a planar fashion across the glass sheet. In order for light to be viewed by the user, light rays escape along the outer periphery of the glass sheet 101 in order to provide an illuminated appearance. The edge of the first glass sheet 101 includes an edge that may be either etched, textured, and/or ground for establishing a path for light to escape though the glass plane. The lighting unit 110 includes one or more light emitting devices 107, which are mounted on a carrier such as printed circuit (PC) board 109. The PC board 109 typically may be made from FR-4 material or similar materials. The light emitting devices 107 may be conventional lighting devices, light emitting diodes (LEDs), or the like. A lighting cover 111 is used in connection with the light emitting devices 107 in order to contain the light by preventing light rays from escaping from the top and sides of the carrier board 109.

Figure 2A:
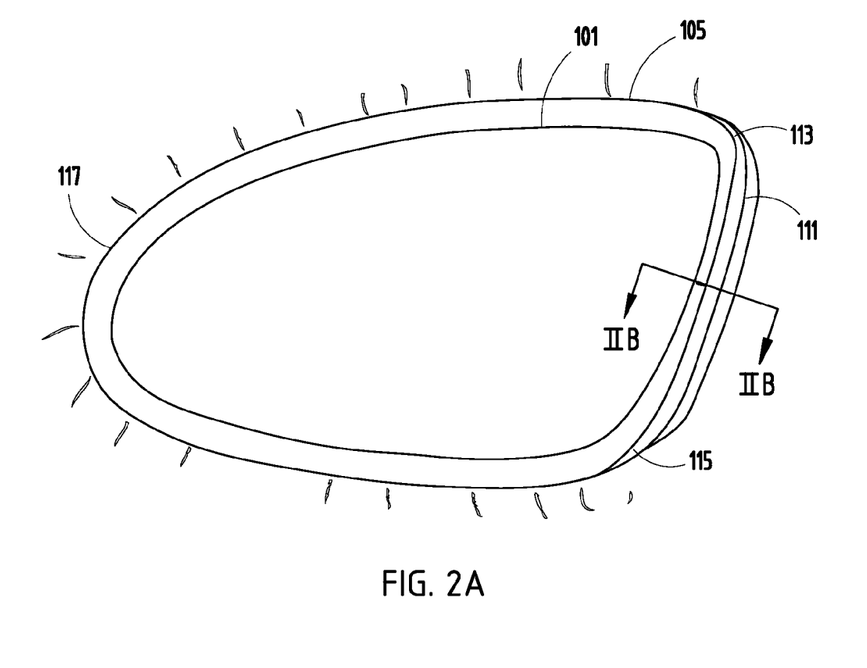
FIGS. 2A, 2B, and 2C are front and section views, respectively, of the outside mirror lighting assembly according to the first embodiment of the present invention.
Figure 2B:
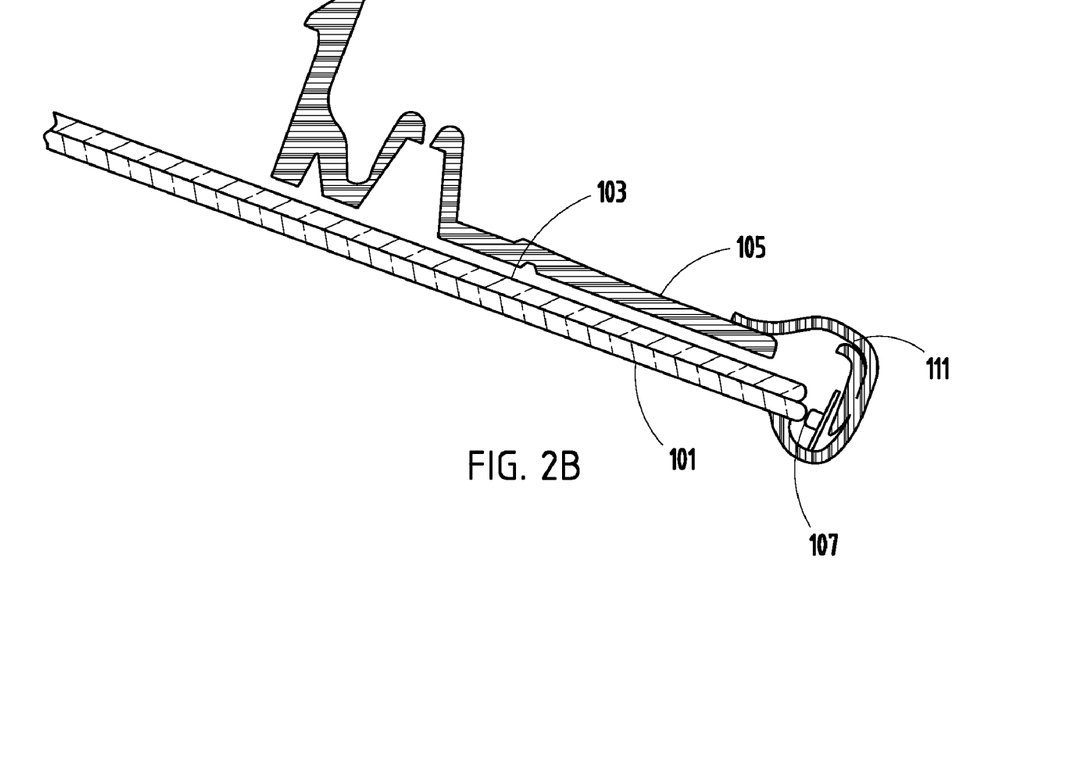
Figure 2C:
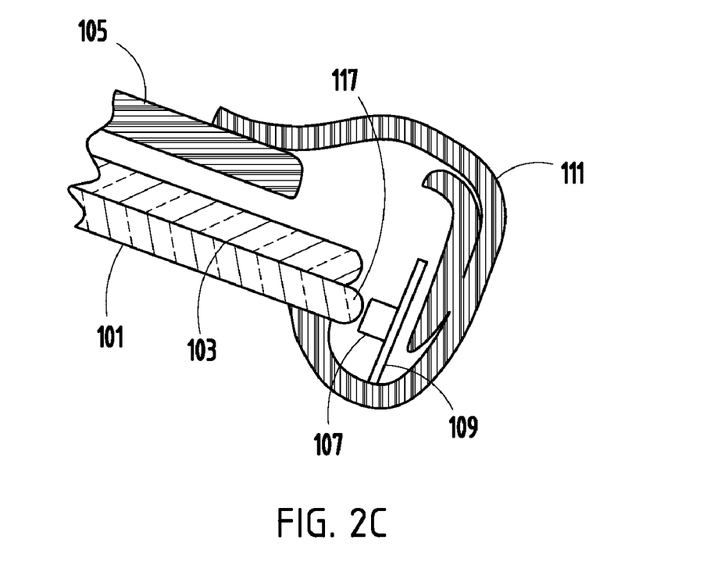

FIGS. 2A, 2B, and 2C are front top sectional and side-sectional views, respectively, of the outside mirror lighting assembly as seen in FIG. 1. FIG. 2A shows a front assembled view illustrating the first glass sheet 101 mounted within the housing 105. The lighting unit cover 111 extends from a top edge 113 to the lower edge 115 of the housing 105. As seen in FIG. 2A, light rays escape from a perimeter edge 117 of the glass sheet 101. This works to illuminate a predefined outer periphery of the mirror lighting assembly 100 which provides a circular like glow. FIG. 2B is a side-sectional view of the mirror assembly shown through lines IIB-IIB as seen in FIG. 2A. This side-sectional view shows the first glass sheet 101 positioned on top and in front of the second glass sheet 103. Both the first glass sheet 101 and second glass sheet 103 are positioned within housing 105 where the lighting unit cover 111 extends around an edge of the lighting unit assembly. FIG. 2C illustrates a magnified sectional view of the lighting unit where a light emitting device 107 is mounted on the PC board 109 and positioned directly adjacent to an edge 117 of the first glass sheet 101. In this manner, light from the light emitting device 107 propagates directly into the planar glass sheet while being contained by the cover 111 of the lighting unit.

Figure 3A:
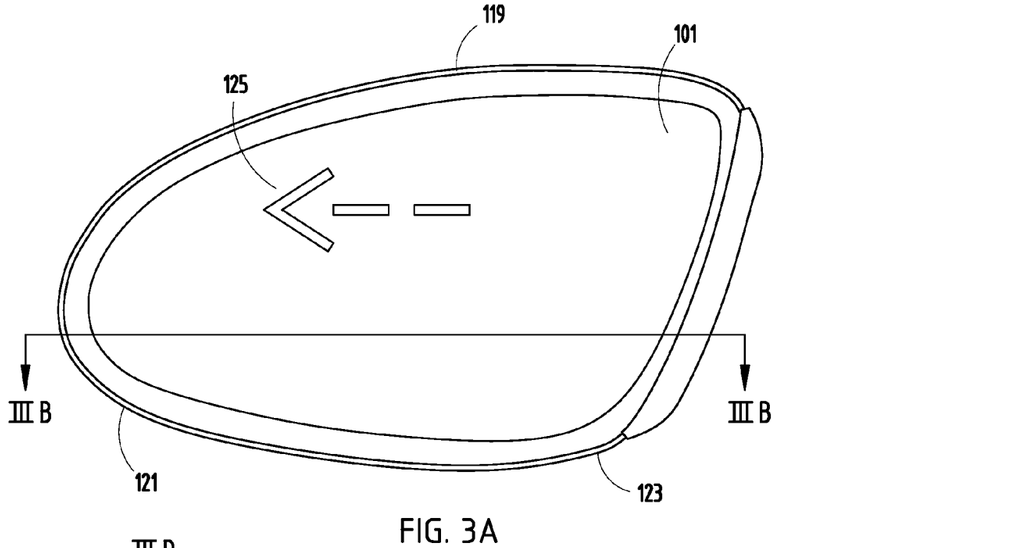
FIGS. 3A and 3B are front and section views of the outside mirror lighting assembly as shown in FIG. 1 where light rays enter and exit the glass sheet.

FIG. 3A is a front view of the first embodiment as shown in FIG. 1 illustrating light rays entering and exiting the glass. As seen in FIG. 3A, light propagates in the planar fashion through the first glass sheet 101, where it is permitted to escape along the edge of the glass at a top edge 119, side edge 121, and bottom edge 123. Optionally, along the face of the first glass sheet 101 an indicia 125 can be used on the front face of the glass sheet 101. The indicia 125 can be either etched, textured, and/or ground into the face of the glass sheet 101 for establishing a path for light to diffuse and escape from the front of the first glass sheet 101. This has the effect of illuminating the indicia 125 in a unique way. As will be recognized by those skilled in the art, the indicia 125 may take many forms, including, but not limited to, a signal indicator, numerical, or textual indication, and/or a symbol or logo. Thus, the indicia 125 can be used to provide the same type of illuminated glow effect as that of the light rays escaping from the edge of the first glass sheet 101.

Figure 3B:
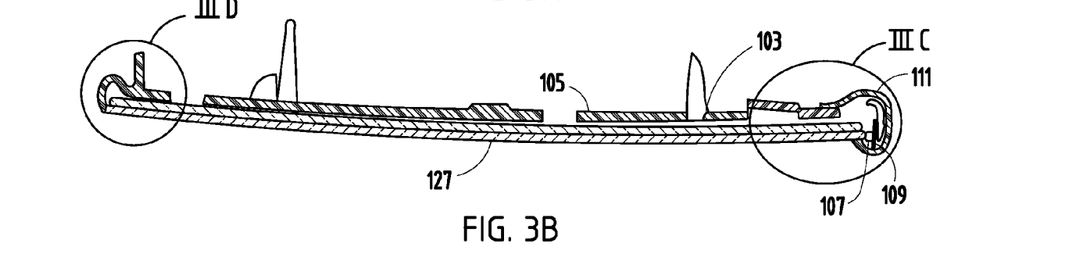

FIG. 3B is a top sectional view shown through lines IIIB-IIIB illustrated in FIG. 3A. The first glass sheet 101 and the second glass sheet 103 are mounted within the housing 105. Light from the light emitting element 107 is positioned upon a PC board 109 such that the cover 111 of the light unit extends around the light emitting device 107. Light rays emitted from the light emitting device 107 propagate through the first glass sheet 101 and escape through an edge 127, which provides a unique and distinctive appearance for the mirror lighting assembly.

Figure 3C:
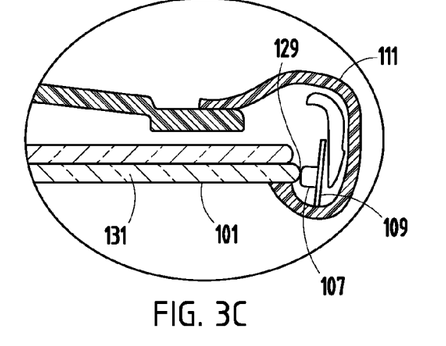
FIGS. 3C and 3D are detailed views of the outside mirror lighting assembly as shown in FIG. 1 where light rays enter and exit the glass sheet.
Figure 3D:
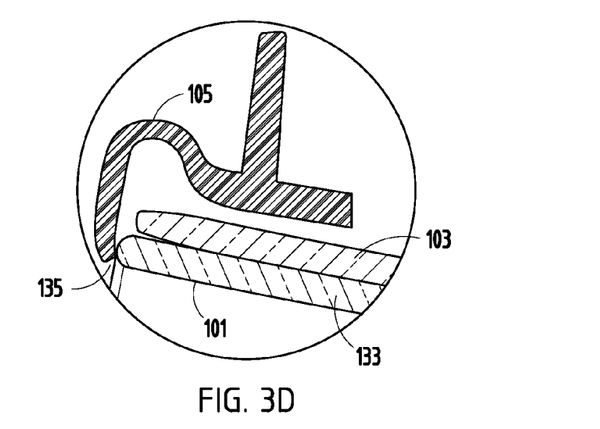

FIGS. 3C and 3D are a magnified cross-sectional view of light entering the glass sheet and a magnified side view showing light escaping from the mirror edge, respectively. More specifically, FIG. 3C shows the first glass sheet 101 positioned adjacent to the light emitting device 107 such that light is introduced into the first glass sheet 101 at its edge 129. The light emitting device 107 is mounted upon the PC board 109, which is surrounded by the cover 111. As light propagates through the glass plane, it is permitted to escape through the edges of the glass plane such as the top edge 131. Similarly, FIG. 3D illustrates light propagating through the first glass sheet 101, which is positioned in front of the second glass sheet 103 and engaged within the housing 105. As light propagates through the first glass sheet 101, it is permitted to escape from around the perimeter edge of the first glass sheet 101, such as the top edge 133 and the side edge 135. As noted herein, this has the effect of creating an illuminated broken semi-circular ring that will provide a glow under predetermined light conditions.

Figure 4:
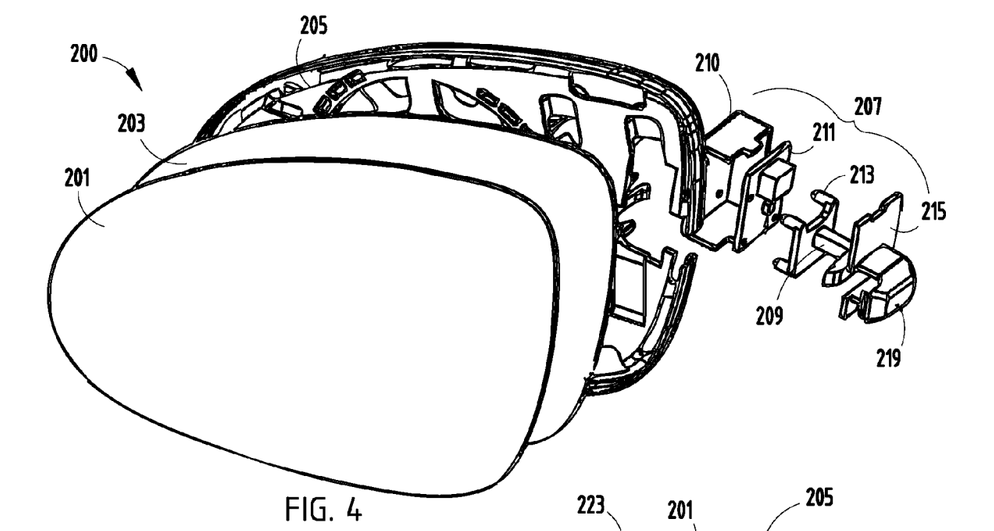
FIG. 4 is an exploded view of the outside mirror lighting assembly according to a second embodiment of the present invention where a light pipe is used as the illuminating device.

FIG. 4 is an exploded view of a second embodiment of the present invention which is illuminated using a light pipe. The mirror lighting assembly 200 includes a first glass sheet 201 and a second glass sheet 203. Similar to that shown in the first embodiment, the first glass sheet 201 sits atop the second glass sheet 203 and both are positioned within a housing 205. In order to illuminate the perimeter of the first glass sheet 201, an indirect lighting source is used, such as a light pipe illumination unit 207. The light pipe illumination unit 207 includes one or more light emitting devices 209, such as high intensity LEDs or the like. The light emitting device 209 is mounted upon a printed circuit board 211 where a light pipe 213 is positioned adjacent to the light emitting device 209 in order to propagate light longitudinally through the light pipe 213. Light blocking covers 215, 217 are joined in order to prevent light from escaping an enclosed area forcing light rays into the light pipe 213. The light pipe 213 further includes a coupling device or section 219 for bending the light in a manner such that it may be coupled into the edge of the first glass sheet 201.

Figures 5A, 5B:
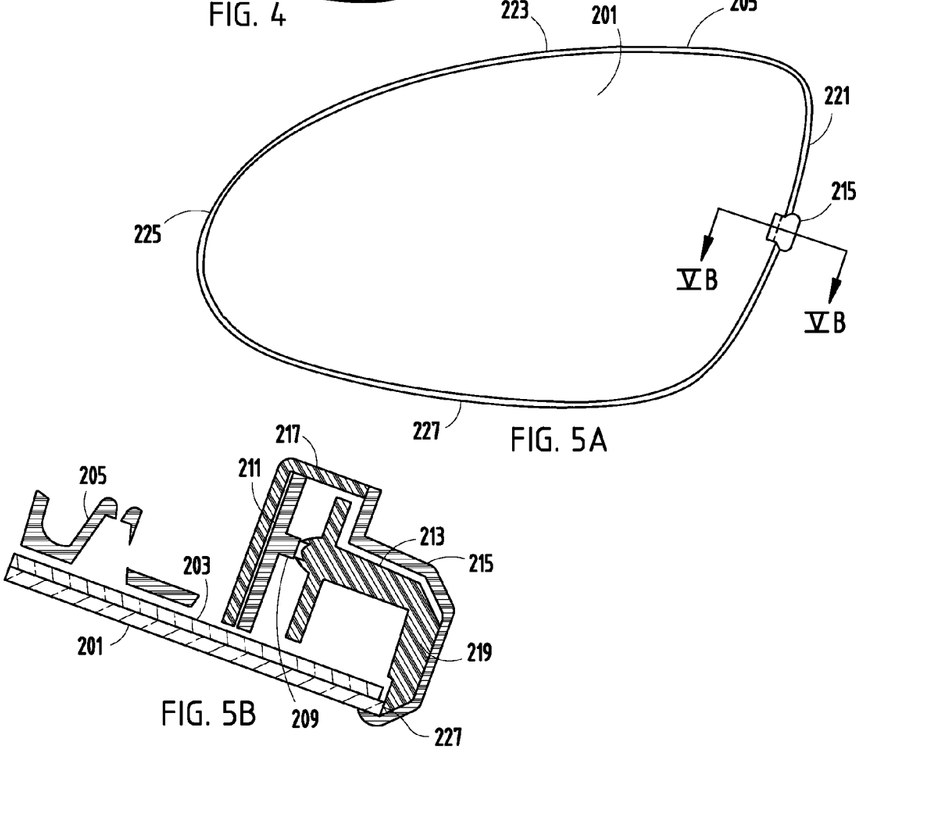
FIGS. 5A and 5B are front and section views of the outside mirror lighting assembly as shown in FIG. 4.

FIGS. 5A and 5B are front and cross-sectional views, respectively, of the second embodiment of the invention. FIG. 5A illustrates a front view of the mirror lighting assembly where the first glass sheet 201 is recessed within the housing 205. The module cover 215 is shown mounted in the housing 205 on an inner side 221 thereof. Light rays from the light pipe 213 propagate in the plane of the first glass sheet 201 in order to provide illumination by the light rays escaping at its perimeter of a top section 223, side section 225, and bottom section 227. FIG. 5B illustrates a magnified top sectional view through lines VB-VB as shown in FIG. 5A. This magnified view shows the light pipe illumination unit arranged where the first glass sheet 201 and second glass sheet 203 are positioned within the housing 205. The light pipe illumination unit is shown such that the covers 215, 217 are joined to enclose the light emitter 209 and light pipe 213. The light pipe 213 is shown bending substantially orthogonally to form a coupling section 219, which is used to introduce light into the edge 227 of the first glass sheet 201. As described above, light propagates through plane of the first glass sheet 201 in order to escape around the glass perimeter to provide a glowing and halo type affect with an illuminating glow.

Figure 6:
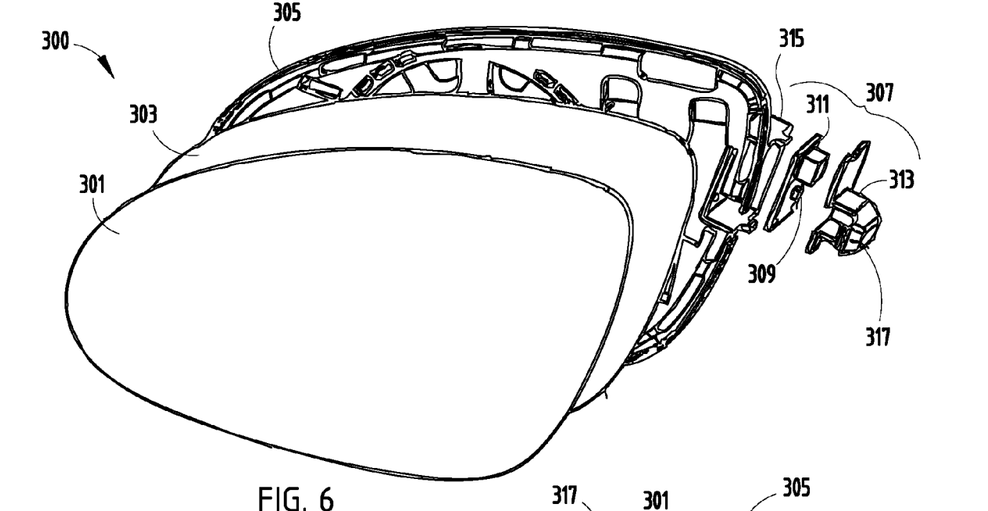
FIG. 6 is an exploded view of the outside mirror lighting assembly according to a third embodiment of the present invention where a reflecting device is used to couple light to the glass sheet.

FIG. 6 is an exploded view of a third embodiment of the present invention which utilizes indirect lighting using a reflective element. The mirror lighting assembly 300 includes a first glass sheet 301 and a second glass sheet 303. The first glass sheet 301 is positioned on top of the second glass sheet 303 and both are mounted within a housing 305. In order to indirectly light an edge of the first glass sheet 301, an illumination unit 307 is used for this purpose. The illumination unit 307 includes one or more light emitting devices 309 which are mounted on a printed circuit board 311. The light emitting devices 309 may be high intensity LEDs or the like. The PC board 311 is enclosed within an illumination unit housing 313, 315. The housing 313 further includes a reflective element 317 that acts to both reflect light from the light emitting device 309 and couple the light to an edge of the first glass sheet 301.

Figure 7A:
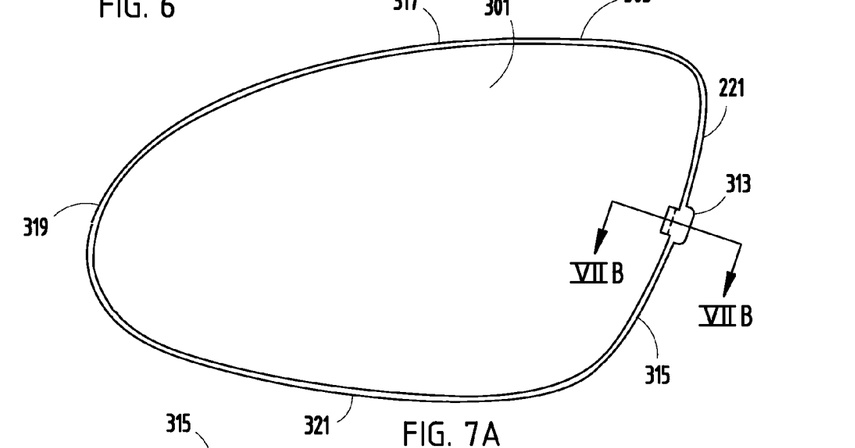
FIGS. 7A and 7B are front and section views of the outside mirror lighting assembly as shown FIG. 6.
Figure 7B:
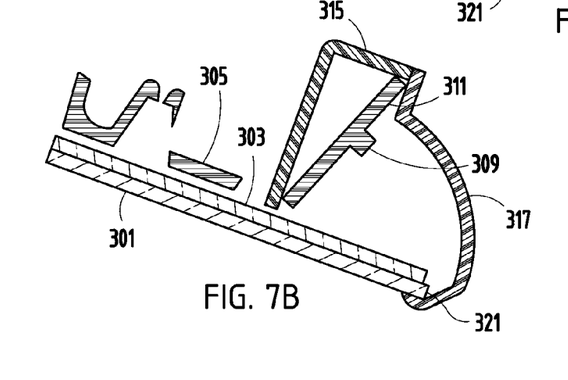

FIGS. 7A and 7B are front and magnified sectional views, respectively, of the outside mirror lighting assembly according to a third embodiment of the present invention. FIG. 7A illustrates a front view of the mirror lighting assembly where the first glass sheet 301 is mounted within housing 305. The illumination unit housing 313 is mounted along an edge 315 of the housing 305. In operation, light coupled from the edge of the first glass sheet 301 propagates through the glass plane where it may exit along a top edge 317, side edge 319 and/or bottom edge 321. Similarly, FIG. 7B is a magnified top sectional view drawn through lines VIIB-VIIB shown in FIG. 7A. The light emitting device 309 is mounted upon PC board 311, which is oriented or tilted at a predetermined angle (θ) when mounted beneath both the illumination housing 315 and reflective element 317. The reflective element 317 works to bend the light from the light emitting device 309 in a manner so it is coupled to an edge 321 of the first glass sheet 301. As described herein, light then propagates through the glass plane of the first glass sheet 301 allowing it to escape along the top, side, and bottom edges to provide a glow and/or illuminated appearance.

Figure 8:
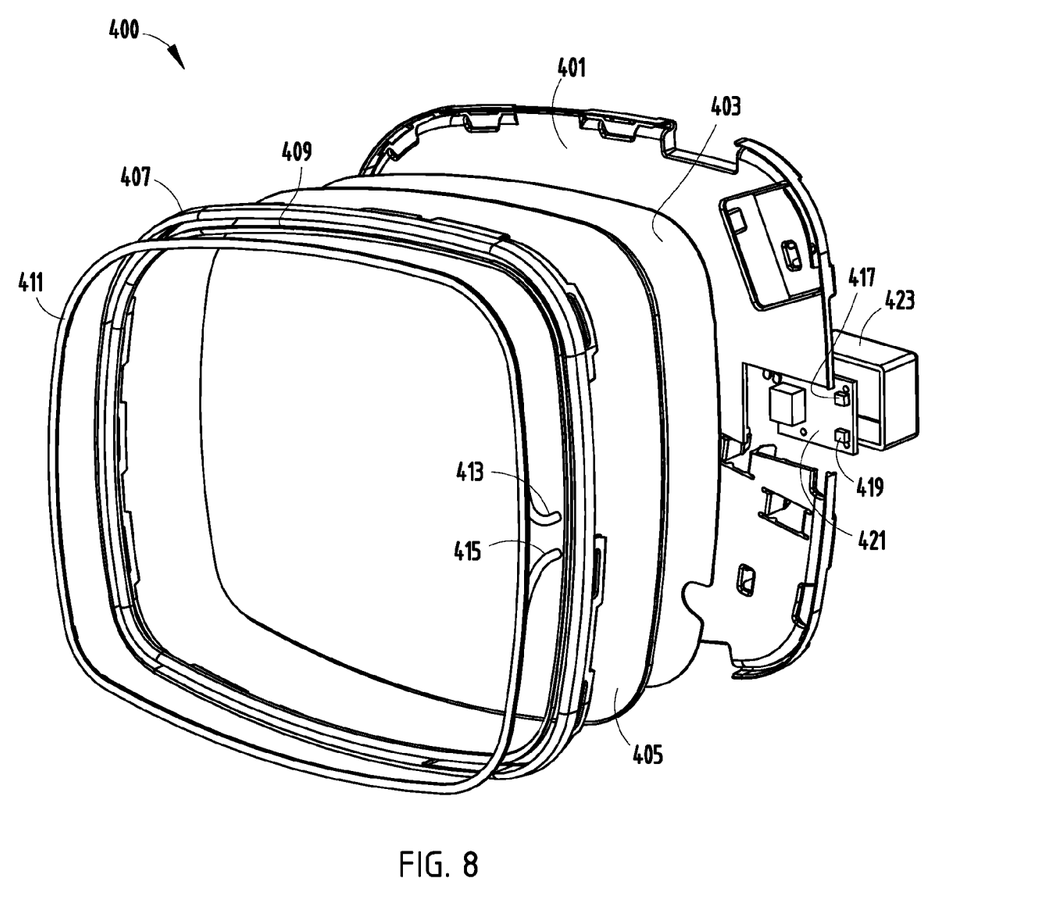
FIG. 8 is an exploded view of an outside mirror lighting assembly using a light pipe in accordance with an alternative embodiment of the invention.

FIG. 8 is an exploded view of an outside mirror lighting assembly using a light pipe 400 in accordance with an alternative embodiment of the invention. The outside mirror lighting assembly 400 includes a glass carrier 401 located at the rear of the assembly which is used to securely hold a heater 403 as well as the mirror glass 405. Although the preferred embodiment is electrochromic (EC) glass, it will be evident to those skilled in the art that standard or non-EC glass may also be used. The heater 403 may be a resistive element that when supplied with a predetermined current, will act to heat the planar glass sheet that forms the mirror glass 405. A cover bezel 407 is conformed to the shape of the mirror glass 405 and provides a top cover along the mirror glass 405 to be inserted about the perimeter of the bezel 407. The glass carrier 401 and the bezel 407 form a compression-type assembly that acts to hold a heater 403 and mirror glass 405 into a fixed position.

The bezel 407 includes a groove or channel 409 that is used to hold a light pipe 411. As described herein, the light pipe 411 is used to provide a decorative and fanciful glow about the perimeter of the bezel 407. The light pipe is supplied with a source of light at a first optical input 413 and second optical input 415. Although only one optical input could be used, the use of the first optical input 413 and second optical input 415 ensure the light will propagate completely around the perimeter of light pipe 411. The source of the light used with the light pipe 411 may be one or more light emitting diodes or other high intensity light sources. In the example, a first LED 417 and second LED 419 are mounted on a printed circuit board 421. The printed circuit board is oriented behind the glass carrier 401 and includes a cover 423 for preventing light from escaping in a rearward direction. The printed circuit board 421 also includes a connector socket 425 that is used to supply power to the heater 403. When the outside mirror lighting assembly 401 in its assembly state, the first light pipe input 413 and second light pipe input 415 are oriented so that they either contact or come in close proximity to the respective surfaces of the first LED 417 and second LED 421. This enables light to propagate into the light pipe 411 in order to illuminate the perimeter of the bezel 407.

Figure 9:
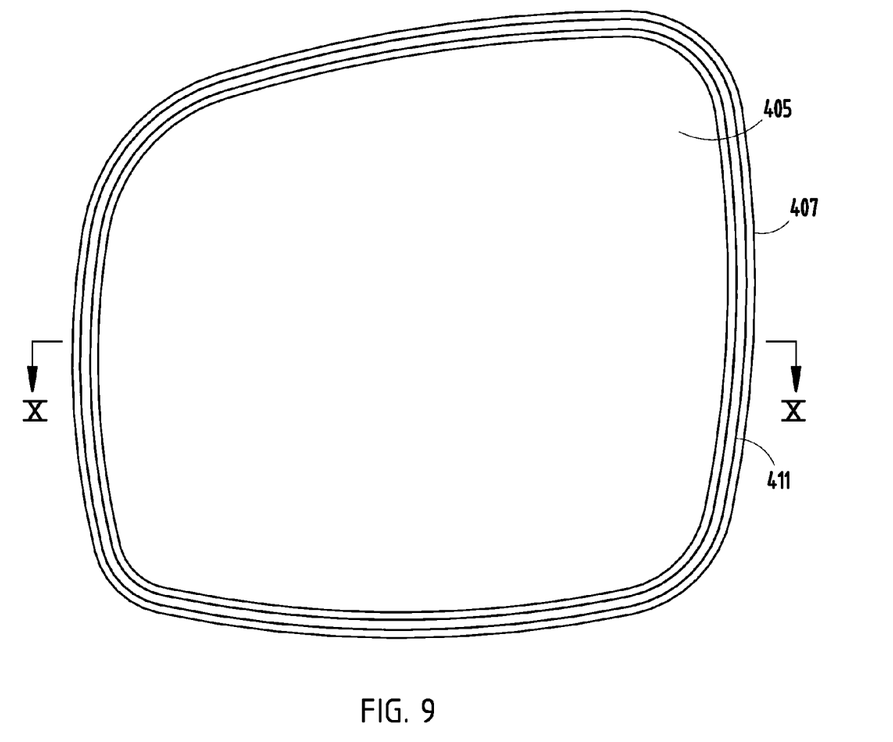
FIGS. 9 and 10 are front and section views, respectively, of the outside mirror lighting assembly as shown in FIG. 8.

FIG. 9 is a front view of the outside mirror lighting assembly 400 as shown in FIG. 8, wherein the light pipe 411 is shown fitted within the channel of the bezel 407. The mirror glass 405 is fitted inside of the light pipe 411 such that the light pipe 411 provides a decorative appearance for the mirror when illuminated.

Figure 10:
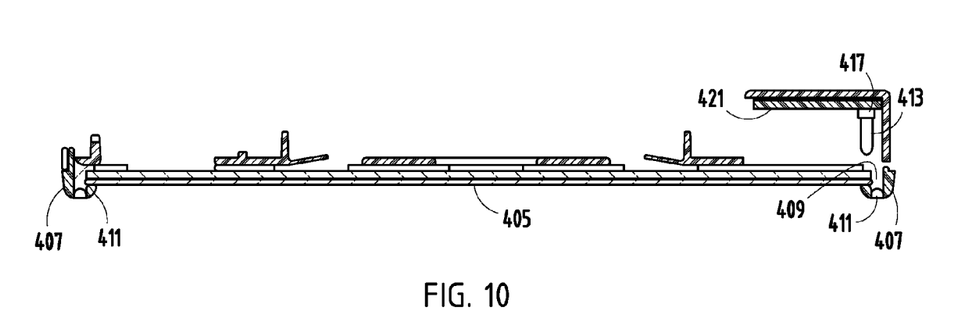

FIG. 10 is a cross-sectional view of the outside mirror lighting assembly taken through lines X-X of FIG. 9. FIG. 10 illustrates the light pipe 411 positioned with channel 409 located into the bezel 407. The first optical input 413 is positioned adjacent to the first LED 417 on the printed circuit board 421 for directing high intensity light directly into the light pipe 411. This provides a decorative appearance as the light surround the mirror glass 405.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A vehicular mirror assembly comprising:
   a housing;
   a first glass panel forming a glass plane having a front surface, rear surface and an edge surface extending around an outer perimeter between the front surface and rear surface;
   a second glass panel positioned behind the first glass panel;

at least one light emitting device positioned at the edge surface of the first glass panel; and wherein light rays from the at least one light emitting device propagate within the plane of the first glass panel for illuminating an outer periphery extending along an outside edge of at least a portion of the edge surface of the first glass panel so that the outer periphery of the at least a portion of the edge surface is illuminated in a substantially semi-circular shape without light propagating from the front surface or rear surface of the first glass panel.

2. A mirror assembly as in claim 1, wherein the substantially semi-circular shape is a non-contiguous ring.

3. A mirror assembly as in claim 1, wherein the at least one light emitting device is a light emitting diode (LED) positioned to directly input the light rays into the first glass panel.

4. A mirror assembly as in claim 1, wherein the at least one light emitting device is a light pipe positioned to indirectly input light rays into the first glass panel.

5. A mirror assembly as in claim 1, wherein the at least one light emitting device is a light emitting diode (LED) positioned to indirectly input light rays into the first glass panel using a reflective element.

6. A mirror assembly as in claim 1, wherein the light emitting device further includes a cover assembly for coupling light to the edge of the first glass panel.

7. A mirror assembly as in claim 1, further comprising:
a textured surface on the surface of the first glass panel for diffusing the light to allow light rays to escape through the textured surface.

8. A mirror assembly as in claim 7, wherein the textured surface forms a design element.

9. A mirror assembly as in claim 7, wherein the textured surface forms a turn signal indicator.

10. A mirror assembly as in claim 7, wherein the textured surface forms a side blind zone indicator.

11. A mirror assembly as in claim 1, wherein the mirror assembly is an inside vehicular mirror.

12. A mirror assembly as in claim 1, wherein the mirror assembly is an outside vehicular mirror.

13. A mirror assembly for use on a vehicle comprising:
a housing for mounting to the vehicle;
a first mirror element forming a glass plane having a front surface, rear surface and an etched edge surface extending around an outer perimeter between the front surface and rear surface;
a second mirror element positioned behind the first mirror element; and
at least one light emitting device positioned adjacent to the first mirror element such that light rays from the at least one light emitting device propagate along optical axes in the glass plane for illuminating the etched edge surface of the outer perimeter in a substantially semi-circular shape.

14. A mirror assembly as in claim 13, wherein the substantially semi-circular shape is a non-contiguous ring.

15. A mirror assembly as in claim 13, wherein the at least one light emitting device is a light emitting diode (LED) positioned for directly emitting light into an edge of the first mirror element.

16. A mirror assembly as in claim 15, wherein the reflective element is a metalized reflector.

17. A mirror assembly as in claim 13, wherein the at least one light emitting device is a light pipe that is positioned adjacent to an edge of the first mirror element for indirectly emitting light therein.

18. A mirror assembly as in claim 13, wherein the at least one light emitting device is a light emitting diode (LED) that utilizes a reflective element for indirectly emitting light into an edge of the first mirror element.

19. A mirror assembly as in claim 13, wherein a section of the first mirror element includes an etched indicia on a front surface for establishing a path in which light rays can escape.

20. A mirror assembly as in claim 13, wherein the mirror assembly is an inside mirror.

21. A mirror assembly as in claim 13, wherein the mirror assembly is an outside mirror.

22. A method for illuminating a mirror lighting assembly comprising the steps of:
providing a first glass panel forming a glass plane having a front surface, rear surface and an edge surface extending around an outer perimeter between the front surface and rear surface;
providing a second glass panel positioned behind the first glass panel;
positioning at least one light emitting device at the edge surface of the first glass panel; and
propagating light rays from the at least one light emitting device along the glass plane of the first glass panel for illuminating substantially the entire edge of the outer periphery edge surface of the first glass panel in a substantially semi-circular shape without light escaping from the front surface or rear surface of the first glass panel.

23. A method for illuminating a mirror lighting assembly as in claim 22, further comprising the step of:
orienting a light emitting diode (LED) in the light emitting device for directly inputting light rays into the first glass panel.

24. A method for illuminating a mirror lighting assembly as in claim 23, further comprising the step of:
orienting a light emitting diode (LED) and light pipe in the light emitting device for indirectly inputting light rays into the first glass panel.

25. A method for illuminating a mirror lighting assembly as in claim 22, further comprising the step of:
orienting a light emitting diode (LED) and reflective element in the light emitting device for indirectly inputting light rays into the first glass panel.

26. A method for illuminating a mirror lighting assembly as in claim 22, further comprising the step of:
providing an indicia on the surface of the first glass panel for diffusing light to allow light rays to escape through the indicia.

27. A method for illuminating a mirror lighting assembly as in claim 26, further comprising the step of:
forming the indicia into a design element logo.

28. A method for illuminating a mirror lighting assembly as in claim 26, further comprising the step of:
forming the indicia into a turn signal indicator.

29. A method for illuminating a mirror lighting assembly as in claim 26, further comprising the step of:
forming the indicia into a side blind zone indicator.

30. A method for illuminating a mirror lighting assembly as in claim 22, further comprising the step of:
utilizing the mirror lighting assembly as an outside vehicular mirror.

31. A method for illuminating a mirror lighting assembly as in claim 22, further comprising the step of:
utilizing the mirror lighting assembly as an inside vehicular mirror.

* * * * *

UNITED STATES PATENT AND TRADEMARK OFFICE
CERTIFICATE OF CORRECTION

PATENT NO. : 8,287,164 B2
APPLICATION NO. : 12/210452
DATED : October 16, 2012
INVENTOR(S) : Edmund Fehn et al.

It is certified that error appears in the above-identified patent and that said Letters Patent is hereby corrected as shown below:

In the Claims:

Column 8
Claim 22, lines 24-25, after "the entire edge" delete "of the outer periphery edge".

Signed and Sealed this
Twenty-first Day of May, 2013

Teresa Stanek Rea
*Acting Director of the United States Patent and Trademark Office*